No. 850,738. PATENTED APR. 16, 1907.
J. T. H. DEMPSTER.
ELECTRICALLY OPERATED VALVE.
APPLICATION FILED JUNE 13, 1901.

Witnesses:
Marcus L. Byng.
Benjamin B. Hull.

Inventor:
John T. H. Dempster,
by Albert H. Davis
Att'y.

UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

ELECTRICALLY-OPERATED VALVE.

No. 850,738.     Specification of Letters Patent.     Patented April 16, 1907.

Application filed June 13, 1901. Serial No. 64,485.

*To all whom it may concern:*

Be it known that I, JOHN T. H. DEMPSTER, a subject of the King of Great Britain, residing at Schenectady, county of Schenectady, State of New York, have invented certain new and useful Improvements in Electrically-Operated Valves, of which the following is a specification.

This invention relates to electrically-operated valves for controlling the flow of fluid through a conduit, and it is especially adapted for regulating the supply of fluid or liquid fuel to a motive-power generator, such as an oil or gasolene engine.

The object of the invention is to provide a device whereby the valve can be operated either by hand in case of necessity or automatically by the governor of the engine either for stopping the engine when it races or for keeping it running at a uniform speed.

It is well known that the lighter hydrocarbon oils will penetrate the most minute crevices, so that in connecting up a gasolene-engine with its supply-tank it is desirable to make as few joints as possible, and all valve-stems must be carefully packed and constantly looked after.

My invention obviates the necessity of using a packed valve-stem, the valve being entirely inclosed in the conduit, but readily accessible. To operate the valve, I provide an electromagnet outside of the conduit, preferably a solenoid concentric with said conduit.

Figure 1:
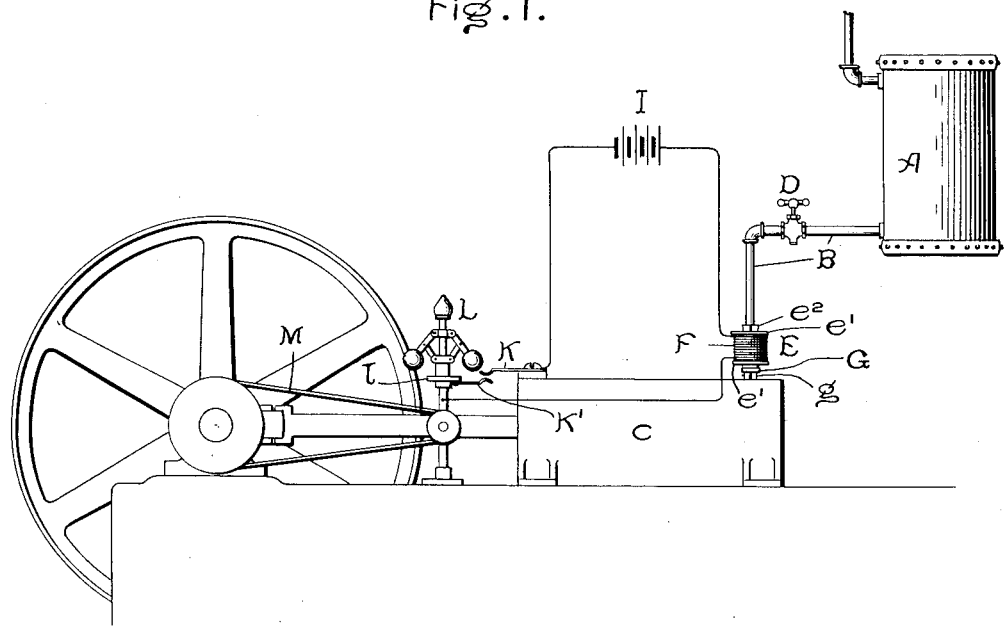
Figure 2:
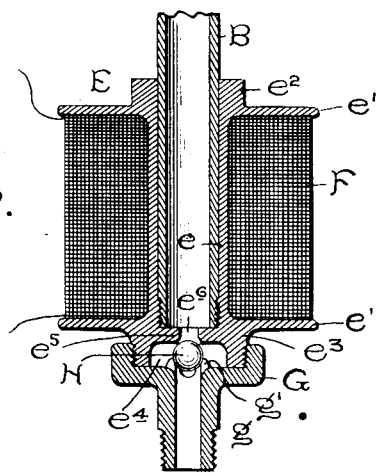
Figure 3:
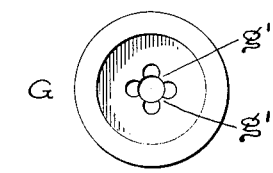
Figure 4:
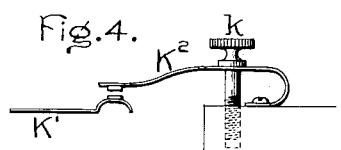

In the accompanying drawings, Figure 1 is a diagrammatic representation of an engine driven by gasolene or other fluid-supply. Fig. 2 is a longitudinal section of the electrically-operated valve on an enlarged scale. Fig. 3 is a plan view of the valve-support. Fig. 4 shows a modified circuit-closer.

The source of power is represented in Fig. 1 by the tank A, which may contain gasolene, oil, or the like, or compressed air, steam, or other fluid power. It communicates by a pipe B with the cylinder C of the engine, a stop-valve D being provided for opening and closing the pipe at will. At some point in the pipe B as close as possible to the cylinder is interposed my electrically-operated valve, which is preferably constructed as follows, though I do not limit myself to the details of construction shown and described, since they may be considerably modified without departing from the spirit of my invention:

The electromagnet has a spool of non-magnetic material composed of a tubular body $e$, provided at each end with preferably integral heads $e'$, having central bosses $e^2$ $e^3$, the former being polygonal and the latter externally screw-threaded, counterbored at $e^4$, and provided with an inwardly-projecting flange $e^5$, forming a contracted opening $e^6$. The pipe B fits into the tubular body $e$ of the spool and is secured therein preferably by means of screw-threads on the pipe engaging with internal screw-threads in the body $e$. The spool receives the helical winding F of insulated wire. A cap G, of non-magnetic material, is screwed upon the boss $e^3$, its tubular neck $g$ being connected with the cylinder C or other receiver for the fluid, which can flow freely through the pipe B, the opening $e^6$, the counterbore $e^4$, and the tubular neck $g$. Three or more studs or prongs $g'$ project from the cap G around the passage in the neck $g$ into the counterbore $e^4$ and support a loose valve H, of steel or other magnetic material, somewhat larger than the opening $e^6$; so that when seated against the flange $e^5$ it will tightly close said opening. When, on the other hand, the valve rests on the studs $g'$, the fluid in the pipe B can flow through the opening $e^6$, around the valve, and between the studs into the passage through the neck $g$.

The pipe B is of iron or other magnetic material, so that when an electric current from any suitable source, such as a battery I, is passed through the winding F the portion of the pipe in the spool becomes magnetized, and the field of magnetic force set up by the electromagnet attracts the ball H against the flange $e^5$ and shuts off the flow of fluid.

The electric circuit, including the winding F and the battery I, includes also a circuit-closer consisting, preferably, of two adjacent springs K K'. These may be closed together by hand, if it is desired to stop the engine at any time, and they may be arranged also to be closed by the governor L of the engine. A centrifugal governor is shown driven by a belt M from the crank-shaft of the engine and having a movable collar $l$, carrying one of the springs, as K', so that when the balls of the governor fly outwardly by reason of an undue increase of speed the circuit will be closed and the supply of power reduced by the closing of the ball-valve.

It will be noted that by placing the valve close to the cylinder and reducing the size of the conduit below the valve when it passes through the neck $g$ I am enabled to reduce to a minimum the quantity of gasolene left below the valve after it closes, and thus insure a prompt stopping of the engine.

By making one of the contacts of the circuit-closer adjustable the governor can regulate the speed of the engine within close limits, since if the contacts are set very near each other only a slight increase in speed will close them and cut off the supply. In Fig. 4 the spring $K^2$ is shown as provided with an adjusting-screw $k$ for accomplishing this result.

It will be seen that this valve is completely inclosed, but is readily accessible for repairs without disturbing the solenoid; that there are but few joints in the structure, and these can be screwed up fluid-tight; that there is a direct passage for the flow of fluid through the device; that the valve in closing moves into a stronger field of force and is there held very securely to its seat, and that when the circuit is broken the pressure of the fluid in the pipe assists the action of gravity in opening the valve.

What I claim as new, and desire to secure by Letters Patent of the United States, is—

1. The combination of a conduit of magnetic material, a valve for opening and closing the conduit, a spool of non-magnetic material independent of the conduit and having an integral portion extending between the end of the conduit and the valve forming a seat for the latter, and a magnet-winding on the spool for actuating the valve.

2. In combination, a magnet-spool composed of non-magnetic material, a winding therefor, a tubular conduit of magnetic material which extends through the spool and is attached thereto, a perforated flange that is carried by the spool, a non-magnetic cap which is detachably secured to the spool by a fluid-tight joint, and a valve which normally rests on the cap and is actuated by the magnet.

3. In combination, a screw-threaded tube of magnetic material, a spool of non-magnetic material which slips over the tube and is held by the screw-thread, a winding therefor, a perforated flange formed on the spool, a screw-threaded extension also formed on the spool which incloses the perforated flange, a cap detachably secured to the extension by the thread, and a valve actuated by the magnet which is normally supported by the cap and is in line with the perforation.

In witness whereof I hereunto set my hand this 11th day of May, 1901.

JOHN T. H. DEMPSTER.

Witnesses:
BENJAMIN B. HULL,
MARGARET E. WOOLLEY.